United States Patent [19]
Lew

[11] Patent Number: 5,115,680
[45] Date of Patent: May 26, 1992

[54] DISPLACEMENT SENSOR WITH MECHANICAL PREAMPLIFICATION MEANS

[76] Inventor: Hyok S. Lew, 7890 Oak St., Arvada, Colo. 80005

[21] Appl. No.: 663,733

[22] Filed: Mar. 4, 1991

[51] Int. Cl.⁵ .............................................. G01B 7/16
[52] U.S. Cl. ........................................ 73/763; 33/788; 73/782
[58] Field of Search .............. 73/763, 774, 782, 866.1; 33/787, 788, 789

[56] References Cited

U.S. PATENT DOCUMENTS 3,082,621  3/1963  Soderholm ...................... 33/788 X

FOREIGN PATENT DOCUMENTS

1286040  1/1962  France ................................. 33/787
147987  7/1920  United Kingdom .................. 33/787

Primary Examiner—Jerry W. Myracle

[57] ABSTRACT

A device for measuring physical variables comprises a pair of thin planar members disposed symmetrically in a face-to-face arrangement about a plane including a reference axis defining the direction of displacement of a target object mechanically coupled to the pair of thin planar members, wherein the displacement in a first direction parallel to the reference axis increases the separation distance between the pair of thin planar members and the displacement in a second direction opposite to the first direction decreases the separation distance between the pair of thin planar members. The physical variable related to the displacement is determined as a function of an electrical parameter varying as a function of the separation distance between the pair of thin planar members such as the electrical capacitance or resistance therebetween measured by a capacitance or ohm meter.

22 Claims, 3 Drawing Sheets

DISPLACEMENT SENSOR WITH MECHANICAL PREAMPLIFICATION MEANS

BACKGROUND OF THE INVENTION

In the field of industrial and scientific measurements, there is a strong demand for a simple and inexpensive device that measures displacements of small magnitude accurately and reliably as such a device can be applied in measuring stresses and strains occuring in many industrial operations and scientific experiments. It is a common presumption of experts as well as novices that the electronic method has always had an advantage over the mechanical method in detecting or measuring physical variables of small magnitude. However, the use of a mechanically amplifying device amplifying the physical variable of small magnitude under measurement to a scale, that can be more readily quantified by an electronic method, often provides an advantage in terms of improved accuracy, broader range of measurement, or reduced cost of the instrumentation. One of the typical shortcomings with many instruments used in industrial operations and scientific experiments is that a highly sensitive instrument has a narrow range of measurement, and an instrument with a wide range of measurement is usually incapable of measuring quantities of small magnitude because it lacks the sensitivity.

BRIEF SUMMARY OF THE INVENTION

The primary object of the present invention is to provide a device measuring displacement of a target object, wherein the displacement of the target object in a first direction is converted to displacement of a mechanically amplifying device taking place in a second direction substantially perpendicular to the first direction, wherein the amplification factor between the two displacements has a high value for displacements of small magnitude under measurement and has a moderate value for displacements of sizable magnitude, which combination of mechanical amplification factor provides a high sensitivity capable of measuring very small displacements and a wide range of measurement for the displacement sensor of the present invention.

Another object is to provide a mechanical displacement amplifying device including at least one thin elongated planar member with stiffness disposed parallel to the direction of the displacement under measurement in an arrangement, wherein one extremity of the thin elongated planar member follows the displacement of the target object under measurement and the other extremity thereof is secured to a support providing a reference point for the measurement of the displacement, in which combination the amplitude of the bending of the thin elongated planar member is measured as a measure of the displacement of the target object.

A further object is to provide a mechanical displacement amplifying device including at least a pair of thin elongated planar members with stiffness disposed symmetrically in a face-to-face arrangement about a plane parallel to the direction of the displacement under measurement, wherein the first extremity of the combination of the two thin elongated planar members follow the displacement of the target object under measurement and the other extremity thereof is secured to a support providing a reference point, in which combination the maximum or average distance between the two thin elongated planar members is measured as a measure of the displacement of the target object.

Yet another object is to provide a mechanical displacement amplifying device including one or more of the thin elongated planar members with stiffness experiencing bending displacement under the displacement of the target object, wherein the displacement of the target object is determined as a function of self or mutual electrical capacitance of the thin elongated planar members.

Yet a further object is to provide a mechanical displacement amplifying device including one or more of the thin elongated planar members with stiffness experiencing bending displacement under the displacement of the target object, wherein the displacement of the target object is determined as a function of ohmic resistance between the thin elongated planar member and a reference electrode, or between the thin elongated planar members.

Still another object is to provide a combination of two mechanical displacement amplifying devices respectively including one or more of the thin elongated planar members, and respectively in touch with the two opposite extremities of the target object, wherein the displacement of the target object is determined as a function of relative values of the electric capacitances associated with the thin elongated planar members included in the two mechanical displacement amplifying devices.

Still a further object is to provide a combination of two mechanical displacement amplifying devices respectively including one or more of the thin elongated planar members, and respectively in touch with the two opposite extremities of the target object, wherein the displacement of the target object is determined as a function of relative values of the ohmic resistances associated with the thin elongated planar members included in the two mechanical displacement amplifying devices.

An additional object is to show how to construct devices measuring stress, strain, force, pressure, flow rate, etc., by using the mechanical displacement amplidying devices of the present invention.

These and other objects of the present invention will become clear as the description of the present invention progresses.

BRIEF DESCRIPTION OF THE FIGURES

The present invention may be described with a greater clarity and specificity by referring to the following figures.

DESCRIPTION OF THE ILLUSTRATED EMBODIMENTS

Figures 1, 2, 3, 4, 5, 6, 7, 8, 9:
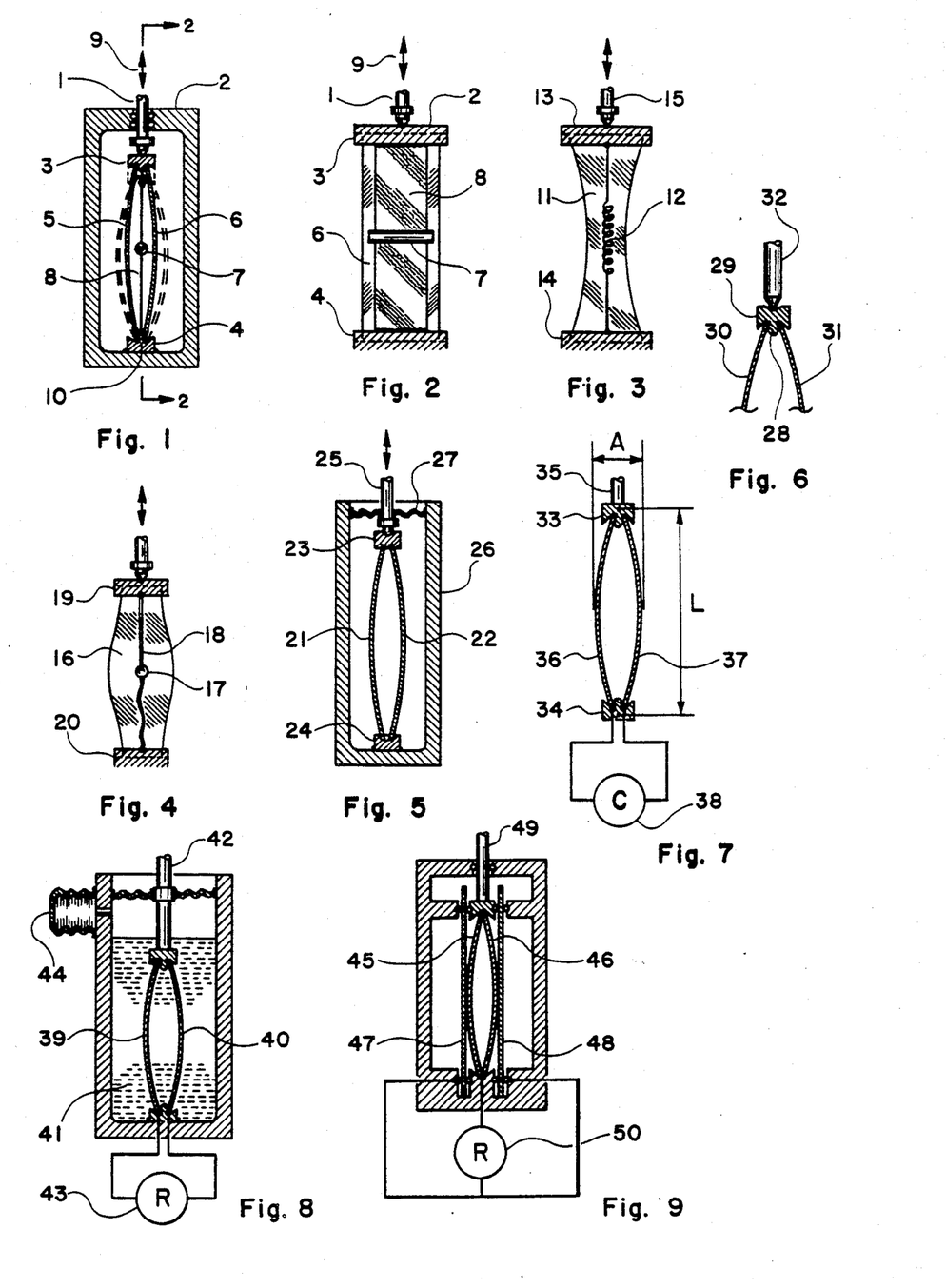
FIG. 1 illustrates a cross section of a structural embodiment of the mechanical displacement amplifying device of the present invention.
FIG. 2 illustrates another cross section of the embodiment shown in FIG. 1, which cross section shows one of the pair of thin elongated planar members with stiffness having a constant width employed in the construction of the mechanical displacement amplifying device shown in FIG. 1.
FIG. 3 illustrates another structural embodiment of the mechanical displacement amplifying device employing a pair of thin elongated planar members with stiffness having a thickness reduced at the midsection thereof.
FIG. 4 illustrates further structural embodiment of the mechanical displacement amplifying device employing a pair of thin elongated planar members with stiffness having a thickness reduced at the two extremities thereof and including a spherical spacing member disposed between the two planar members.
FIG. 5 illustrates a cross section of an embodiment of the mechanical displacement amplifying device including a pair of thin elongated planar members with stiffness fixedly supported at the two extremities thereof.
FIG. 6 illustrates a cross section of an embodiment of the supporting block supporting one of the two extremities of the combination of a pair of thin elongated planar members with stiffness included in the mechanical displacement amplifying device.
FIG. 7 illustrates a method that determines the displacement of a target object as a function of mutual electrical capacitance between the two thin elongated planar members with stiffness included in the mechanical displacement amplifying device.
FIG. 8 illustrates a method that determines the displacement of a target object as a function of ohmic resistance between the two thin elongated planar members with stiffness included in the mechanical displacement amplifying device.
FIG. 9 illustrates another method that determines the displacement of a target object as a function of ohmic resistance associated with the two thin elongated planar members with stiffness included in the mechanical displacement amplifying device.

In FIG. 1 there is illustrated a cross section of an embodiment of the mechanical displacement amplifying device constructed in accordance with the principles of the present invention. A target object undergoing a displacement that is to be measured is connected to the displacement transmitting member 1 supported by the body 2 of the device in a freely slidable arrangement in direction of the displacement under measurement. A first support block 3 is disposed in such a way that it always follows the movement of the displacement transmitting member, while a second support block 4 is affixed to the body 2 of the device in an arrangement wherein the displacement transmitting member 1, the first and second support blocks 3 and 4 are disposed in an in-line relationship. A pair of thin elongated planar members 5 and 6 with appropriate stiffness are disposed symmetrically in a face-to-face arrangement about a plane including the central axis of the combination of the displacement transmitting member 1 and the two support blocks 3 and 4, which combination of the two thin planar members 5 and 6 are supported at the two extremities thereof by the two support blocks 3 and 4 in a retaining arrangement, respectively, wherein each end of the thin planar members 5 and 6 may be supported simply allowing free bending movement thereat as shown in the particular illustrated embodiment shown or supported fixedly preventing bending movement thereat as shown in the illustrative embodiment shown in FIG. 5. A cylindrical member 7 with a diameter slightly greater than the separation distance between the two thin planar members 5 and 6 when they are at a state of zero bending, is disposed between the two thin planar members 5 and 6 in a parallel relationship thereto and secured to a midsection of a flexible ribbon 8 anchored to the two support blocks 3 and 4 at its two extremities, respectively, which cylindrical member 7 ensures that the two thin planar members 5 and 6 bend away from one another in a mirror image relationship. It is readily recognized from the illustrated embodiment that the displacement 9 of the displacement transmitting member 1 in directions parallel thereto changes the separation distance between the two thin planar members 5 and 6 in an amplifying relationship, as shown by a new position of the two thin planar members 5 and 6 shown in broken lines. It should be understood that the two thin planar members 5 and 6 may be very thin elastic sheets of a very small value of stiffness having little resistance against bending deflection thereof wherein the combination of the two thin planar members 5 and 6 provides little spring bias force against the displacement of the displacement transmitting member 1, or they may be thin plates of significant stiffness wherein the combination of the two thin planar members 5 and 6 provides a built-in spring bias force against the displacement of the displacement transmitting member 1 in a direction that increases bending deflection of the two thin planar members in a mirror image relationship. It should be mentioned that the adjacent supported extremities of the two thin planar members 5 and 6 may be physically separated from one another by a spacer 10 included in the support blocks 3 and 4, or they may be in contact with one another as shown in the embodiment illustrated in FIG. 9. It should be further mentioned that the two thin planar members 5 and 6 may be disposed in a modified arrangement wherein they bend towards one another in a mirror image relationship instead of away from one another as shown in the embodiment illustrated in FIG. 16.

In FIG. 2 there is illustrated another cross section of the embodiment shown in FIG. 1, which cross section taken along plane 1—1 as shown in FIG. 1 shows one of the two thin planar members 5 and 6 having a constant width.

In FIG. 3 there is illustrated a cross section equivalent to that shown in FIG. 2, which shows another embodiment of the mechanical displacement amplifying device having essentially the same construction as that of the embodiment shown in FIG. 1, wherein one of the pair of thin planar members 11 is shown. The thin planar members employed in this embodiment have a reduced width at the midsection thereof. A coil spring 12 exerting a tension between the two support blocks 13 and 14 partially or totally compensates the spring bias force provided by the pair of thin planar members, which coil spring 12 also ensures that the two thin planar members bend away from one another under the compressive movement of the displacement transmitting member 15.

In FIG. 4 there is illustrated a cross section of a further embodiment of the mechanical displacement amplifying device employing a pair of thin planar members including the element 16 that has an increased width at its midsection. A sphere 17 disposed between the two thin planar members and tethered by a string 18 secured to the two support blocks 19 and 20 at its two extremities ensures that the two thin planar members bend away from one another in a mirror image relationship.

In FIG. 5 there is illustrated a cross section of the mechanical displacement amplifying device having essentially the same construction as that shown in FIG. 1 with a few exceptions, which exception includes that, firstly, the pair of thin planar members 21 and 22 are secured to the two support blocks 23 and 24 at their extremities in a fixed arrangement preventing bending deflection of the thin planar members at their extremities and, secondly, the displacement transmitting member 25 is supported by the body 26 of the device by a diaphragm or disc 27 wherein the lateral flexibility of the disc 27 allows the axial displacement of the displacement transmitting member 25.

In FIG. 6 there is illustrated an embodiment of the construction of a support block that eliminates the need of a spacer such as those elements 7, 12 and 17 respectively included in the embodiments shown in FIGS. 1, 3 and 4, each of which limits the separation distance between the two thin planar members to a predetermined minimum value which ensures that the two thin planar members bend away from one another in a mirror image relationship. The spacer 28 included in the support block 29 has a taper that keeps the pair of thin planar members 30 and 31 slightly bowed away from one another even when the displacement of the displacement transmitting member 32 registers zero.

In FIG. 7 there is illustrated an operating principle of the displacement sensor of the present invention including the mechanical displacement amplifying device built thereinto. It is not difficult to show that the distance L between the two support blocks representing the displacement of the displacement transmitting member 35 relative to the support block 34 is related to the maximum separation distance A between the two thin planar members 36 and 37 by equation $$S = \frac{2L}{\pi} \left\{ 1 + \left[ \frac{\pi(A - A_0)}{2L} \right]^2 \right\}^{\frac{1}{2}} \cdot \quad (1)$$

$$\int_0^{\frac{\pi}{2}} \left\{ 1 - \frac{\left[ \frac{\pi(A - A_0)}{2L} \right]^2}{1 + \left[ \frac{\pi(A - A_0)}{2L} \right]^2} \sin^2\phi \right\}^{\frac{1}{2}} d\phi,$$

where S is the length of the thin planar members 36 and 37, and $A_0$ is the distance between the two thin planar members when they are at perfectly straight positions. As equation (1) defines the functional relationship between L and A, the displacement L of a target object coupled to the displacement transmitting member 35 can be determined as a function of A by using an empirically obtained mathematical relationship equivalent to equation (1) when A is measured by electrical means. It can be readily shown that the derivative of A with respect to L can be obtained from the differential form of equation (1)

$$\frac{dA}{dL} = \quad (2)$$

$$\left( \frac{A - A_0}{2} \right)^2 \left[ \frac{2}{L(A - A_0)} + \frac{\pi^2}{2\alpha} \frac{A - A_0}{2} \right] \left\{ 1 - \left[ 1 + \frac{4\alpha(L^3 - \alpha)}{\left[ 2\alpha + \pi^2 L \left( \frac{A - A_0}{2} \right)^2 \right]^2} \right]^{\frac{1}{2}} \right\}.$$

where $$\alpha = 2 \left[ L^2 + \pi^2 \left( \frac{A - A_0}{2} \right)^2 \right] \frac{\left[ \frac{\pi(A - A_0)}{2L} \right]^6}{\left\{ 1 + \left[ \frac{\pi(A - A_0)}{2L} \right]^2 \right\}^5}.$$

$$\left\{ \frac{\int_0^{\frac{\pi}{2}} \left[1 - \frac{\left[\frac{\pi(A-A_0)}{2L}\right]^2}{1 + \left[\frac{\pi(A-A_0)}{2L}\right]^2} \sin^2\phi\right]^{-\frac{1}{2}} \cdot \sin^2\phi \, d\phi}{\int_0^{\frac{\pi}{2}} \left[1 - \frac{\left[\frac{\pi(A-A_0)}{2L}\right]^2}{1 + \left[\frac{\pi(A-A_0)}{2L}\right]^2} \sin^2\phi\right]^{\frac{1}{2}} d\phi} \right\}^2$$

In an initial stage of displacement where A deviates from $A_0$ by a very small value wherein $\alpha$ approaches zero, equation (2) reduces to the following form:

$$\frac{dA}{dL} = -\frac{2L}{\pi^2(A-A_0)}. \tag{3}$$

It is realized from equation (3) that, when A is very close to $A_0$, a very small change in L (a very small initial displacement) results in a large change in A (amplified displacement). In other words, the mechanical displacement amplifying device amplifies very small initial displacement by a very large ratio and, consequently, it enables the measuring device employing it to measure very small displacement, stress, strain, force, flow rates, etc. The amplification factor becomes drastically smaller as the initial stage of the small displacement developes into a displacement of sizable magnitude, which characteristics provides the measuring device employing the mechanical displacement amplifying device with a broad range of measurement. In other words, the mechanical displacement amplifying device of the present invention provides a sensitivity or resolution that is very high at the lower end of the range of measurement and is progressively decreasing as the measurement moves towards the upper end of the range thereof, which combination provides the ideal characteristics for measuring devices, that is the ability to measure very small physical variables and to operate in a broad range covering very small values as well as very large values of the physical variables. In the particular embodiment shown in FIG. 7, the separation distance A is determined by measuring the electrical capacitance C between the two thin planar members 36 and 37 by means of a capacitance meter 38. In actual calibration of a sensing device employing the mechanical displacement amplifying device, an empirical relationship between the capacitance C and the stress, strain, pressure, weight, or flow rate represented by the displacement of the displacement transmitting member 35 must be obtained experimentally and stored in the memory of an electronic data processor that determines the physical variable represented by the displacement of the displacement transmitting member 35 as a function of the measured value of the capacitance C. It is readily recognized that the two thin planar members 36 and 37 must be made of or includes electrically conducting material such as a metallic substance.

In FIG. 8 there is illustrated another operating principle of the mechanical displacement amplifying device comprising a pair of thin planar members 39 and 40 which are now submerged in a mildly conducting fluid 41. The physical variables represented by the displacement of the displacement transmitting member 42 is determined as a function of the ohmic resistance R between the two thin planar members measured by an ohm meter 43, wherein an empirically obtained mathematical relationship therebetween is used. The air or gas space above the free surface of the mildly conducting fluid 41 is vented by a venting means 44. It is realized that the pair of thin planar members 39 and 40 must be made of metallic material having a good electrical conductivity or coated with a metallic layer if the two thin planar members are made of nonconducting material.

In FIG. 9 there is illustrated a further operating principle of the mechanical displacement amplifying device including a combination of a pair of thin planar members 45 and 46 sandwiched between another pair of thin flat planar members 47 and 48, wherein each of the two thin planar members 45 and 46, and each of the two thin planar members 47 and 48 are separated by a very small gap or barely in contact therebetween when the displacement represented by the movement of the displacement transmitting member 49 is zero. The thin planar members 45, 46, 47 and 48 made of electrically conducting material such as a metallic substance is coated with a thin layer of mildly conducting material, whereby the ohmic resistance between the two combinations of the pair of thin planar members varies proportionally to the area of surface contact therebetween, which area of surface contact varies in proportion to the separation distance between the two thin planar members 45 and 46. The physical variables represented by the displacement of the displacement transmitting member 49 is determined as a function of the ohmic resistance measured by the ohm meter 50, wherein an empirically obtained mathematical relationship therebetween is used.

Figures 10, 11, 12, 13, 14, 15, 16:
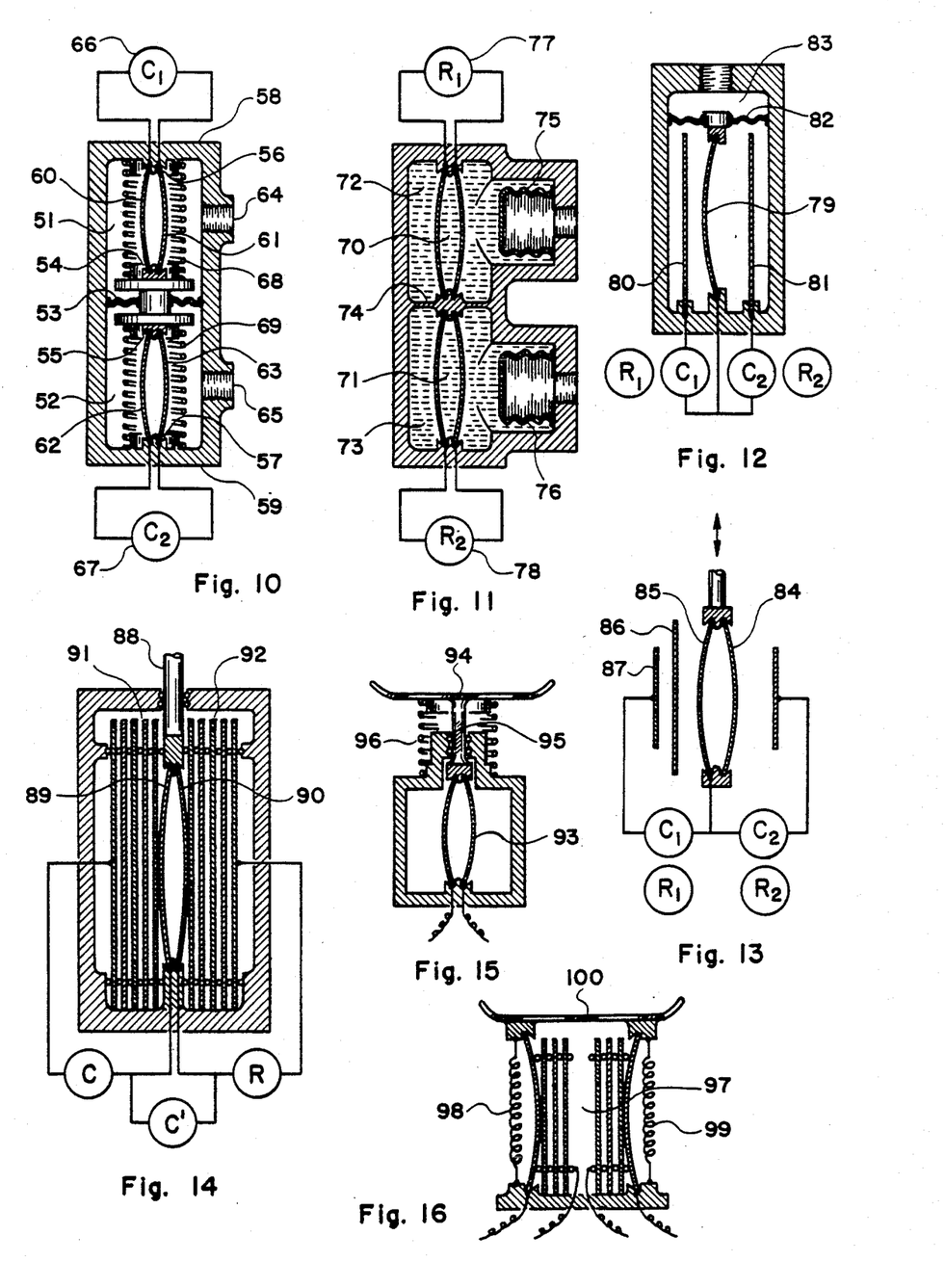
FIG. 10 illustrates a cross section of an embodiment of the differential pressure sensor employing a pair of mechanical displacement amplifying devices which operates on the principles of electrical capacitance measurement.
FIG. 11 illustrates a cross section of an embodiment of the differential pressure sensor employing a pair of mechanical displacement amplifying devices, which operates on the principles of ohmic resistance measurement.
FIG. 12 illustrates a cross section of an embodiment of the mechanical displacement amplifying device employing a single elongated planar member with stiffness, which is applied in the construction of a pressure sensor.
FIG. 13 illustrates a cross section of an embodiment of the mechanical displacement amplifying device including a pair of thin elongated planar members with stiffness, wherein electrical capacitances or ohmic resistances between one of the two thin elongated planar members and two reference electrodes are measured as a measure of displacement of a target object.
FIG. 14 illustrates a cross section of an embodiment of the mechanical displacement amplifying device including a pair of thin elongated planar members with stiffness sandwiched between a plurality of thin elongated planar members disposed in a parallel arrangement, which combination provides a spring bias against the displacement of a target object wherein the spring constant of the spring bias increases progressively with increasing displacement.
FIG. 15 illustrates an embodiment of the mechanical displacement amplifying device employed in the construction of a weight scale.
FIG. 16 illustrates another embodiment of the mechanical displacement amplifying device employed in the construction of another weight scale.

In FIG. 10 there is illustrated an embodiment of measuring instruments, that employs a combination of two mechanical displacement amplifying devices respectively connected to the two opposite ends of a target object. The pressure sensor includes two pressure chambers 51 and 52 separated from one another by a flexible diaphragm or disc 53, which diaphragm or disc 53 supports a pair of support blocks 54 and 55 respectively disposed on the two opposite sides thereof and affixed to the central portion of the diaphragm or disc 53. Another pair of support blocks 56 and 57 are respectively affixed to two rigid end walls 58 and 59 of the pressure chambers 51 and 52. The first pair of thin planar members 60 and 61 supported by the first pair of supporting blocks 54 and 56, and the second pair of thin planar members 62 and 63 supported by the second pair of supporing blocks 55 and 57 provide a pair of mechanical displacement amplifying devices, wherein the separation distances or gaps between the two thin planar members included in the two mechanical displacement amplifying devices change in two opposite directions when the diaphragm 53 is laterally deflected due to the difference in two pressures respectively supplied through two pressure ports 64 and 65. The value of differential pressure $\Delta P$ is determined as a function of the ratio between two capacitance values $C_1$ and $C_2$ of the two sets of the two thin planar members respectively measured by two capacitance meters 66 and 67, or as a function of a differential combination of the two capacitance values $C_1$ and $C_2$.

$$\Delta P = f_1(C_1/C_2), \tag{4}$$

or $$\Delta P = f_2[(C_1 - \alpha C_2)], \quad (5)$$

where $\alpha$ is an empirically determined constant. In general, the method given by equation (4) is preferred because this method is immune to the error introduced by the change of electrical characteristics of the materials and ambient conditions as the ratio of the two capacitance values $C_1$ and $C_2$ cancels out the effect of such a change. Of course, the mathematical relationships $f_1$ and $f_2$ included in equations (4) and (5) must be determined empirically. A pair of preloaded coil springs 68 and 69 may be employed to adjust the relationship between the differential pressure $\Delta P$ and the ratio or difference between the two capacitance values $C_1$ and $C_2$.

In FIG. 11 there is illustrated another embodiment of the measuring instruments, that employs a combination of two mechanical displacement amplifying devices. This version of the differential pressure sensor comprises two sets 70 and 71 of the pair of thin planar members respectively disposed within two pressure compartments 72 and 73 filled with a mildy conducting fluid. The two pressure compartments 72 and 73 separated from one another by a flexible diaphragm or disc 74 respectively take two pressures across two flexible pressure transmitting barriers 75 and 76, respectively. The differential pressure $\Delta P$ is determined as a function of the ratio between two ohmic resistance values $R_1$ and $R_2$ between the two thin planar members included in each of the two mechanical displacement amplifying devices 70 and 71, and respectively measured by two ohm meters 77 and 78 or as a function of difference therebetween $$\Delta P = f_3(R_1/R_2), \quad (6)$$

or $$\Delta P = f_4[(R_1 - \beta R_2)], \quad (7)$$

where $f_3$ and $f_4$ stand for empirically determined mathematical relationships and $\beta$ is an empirically determined constant. For the same reason that equation (4) is preferred over equation (5), equation (6) provides more accurate and reliable measurement compared with equation (7).

In FIG. 12 there is illustrated a modified version of the embodiments of the mechanical displacement amplifying devices shown in FIGS. 1, 5, 7 or 8. This embodiment includes a single thin planar member with stiffness 79 instead of a pair, which single thin planar member 79 is disposed intermediate a pair of electrodes 80 and 81. The degree of bending of the thin planar member 79 is measured in terms of the value of the capacitance or the value of the resistance associated with the thin planar member 79. The value of the pressure contained in the pressure chamber 83 causing the deflection of the diaphragm or disc 82 is determined as a function of the capacitance or resistance associated with the thin planar member 79 by using one of the following empirically derived mathematical relationships:

$$p = g_1(C_1), p = g_2(C_2), p = g_3(R_1), p = g_4(R_2), \quad (8)$$

$$p = g_5\left(\frac{C_1}{C_2}\right), p = g_6(C_1 - \alpha C_2), p = g_7\left(\frac{R_1}{R_2}\right),$$

or $$p = g_8(R_1 - \beta R_2),$$

where $C_1$ and $R_1$ are respectively the values of the capacitance and resistance between the thin planar member 79 and the electrode 80, while $C_2$ and $R_2$ are respectively the values of the capacitance and resistance between the thin planar member 79 and the electrode 81. The constants $\alpha$ and $\beta$ are to be determined empirically. Of course, the compartment housing the mechanical displacement amplifying device 79 has to be filled with a mildly conducting fluid if the measuring operation involves the measurement of the ohmic resistance $R_1$ and/or $R_2$. It is readily realized that the type of mechanical displacement amplifying device shown in FIG. 9 works with only one half of the assembly of the thin planar members included therein as suggested by the embodiment shown in FIG. 12.

In FIG. 13 there is illustrated an embodiment of the modified version of the mechanical displacement amplifying device shown in FIG. 12, that includes additional elements such as a second thin planar member 84 made of a dielectric material and disposed in a mirror image of the thin planar member 85 made of conducting material, and another dielectric planar member 86 disposed intermediate the thin conductor planar member 86 and the electrode 87. This embodiment operates on the same principles as those described in conjunction with the embodiment shown in FIG. 12. As the dielectric planar member 86 is included merely to balance out the electrical effect of the dielectric thin planar member 84, this embodiment works with or without the dielectric planar member 86.

In FIG. 14 there is illustrated a cross section of an embodiment of the mechanical displacement amplifying device that plays dual role of amplifying the displacement transmitted by the displacement transmitting member 88, and providing a spring bias force with a spring coefficient progressively increasing with the increasing displacement that bends the two thin planar members 89 and 90 further apart from one another. As the increasing amount of the displacement transmitted by the displacement transmitting member 88 spreads the two thin planar members 89 and 90 further and further away from one another, they come into contact with a series of planar members 91 and 92 disposed on the two opposite sides thereof in a closely spaced parallel arrangement. The increasing compressive displacement transmitted by the displacement transmitting member 88 produces bending of increasing number of the planar members 91 and 92 and, consequently, the spring bias force against the compressive displacement provided by the plurality of planar members 89, 90, 91 and 92 increases nonlinearly. As a consequence, the embodiment of the mechanical displacement amplifying device shown in FIG. 14 provides a high sensitivity as well as a broad range of measurement for the measuring instruments employing this type of mechanical displacement amplifying device into the construction thereof. The physical variables represented by the displacement transmitted by the displacement transmitting member 88 is determined as a function of the capacitance value C or C', or the resistance value R.

In FIG. 15 there is illustrated an embodiment of the weighing scale that employs a mechanical displacement amplifying device 93 coupled to the weighing tray 94 by the displacement transmitting member 95, wherein the coil spring 96 provides the spring bias force against the compressive displacement exerted by the weight placed on the tray 94. The mechanical displacement amplifying device 93 may be any one of the types shown in FIGS. 1 through 14 operating on the principles of capacitance measurement or ohmic resistance measurement.

In FIG. 16 there is illustrated another embodiment of the weighing scale that employs the mechanical displacement amplifying device 97 of the type shown in FIG. 14, that provides a fine resolution as well as a wide range in the weight measurement. A pair of coil springs 98 and 99 preloads the weighing tray 100 to a desired level whereat the mechanical displacement amplifying device 97 operates most effectively.

Figure 17:
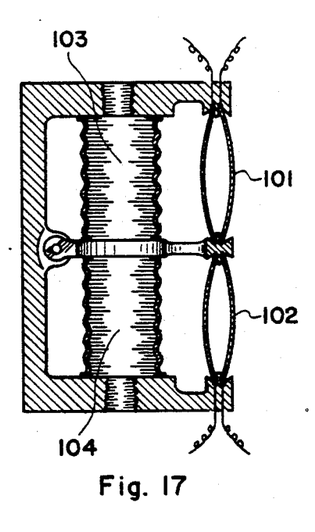
FIG. 17 illustrates a combination of two mechanical displacement amplifying devices employed in the construction of a differential pressure sensor.

In FIG. 17 there is illustrated a cross section of an embodiment of the differential pressure sensor employing a pair of mechanical displacement amplifying devices 101 and 102 disposed externally to the bellow type pressure chambers 103 and 104. This version of the differential pressure sensor may operate on the same principles as those set forth by equation (4), (5), (6) or (7). The mechanical displacement amplifying devices 101 and 102 may be any one of the types shown in FIGS. 1 through 14 operating on the principles of the capacitance measurement or resistance measurement. It is clear that the two mechanical displacement amplifying devices 101 and 102 may be disposed internally to the pressure chambers 103 and 104 as demonstrated by the embodiments shown in FIGS. 10 and 11.

Figures 18, 21:
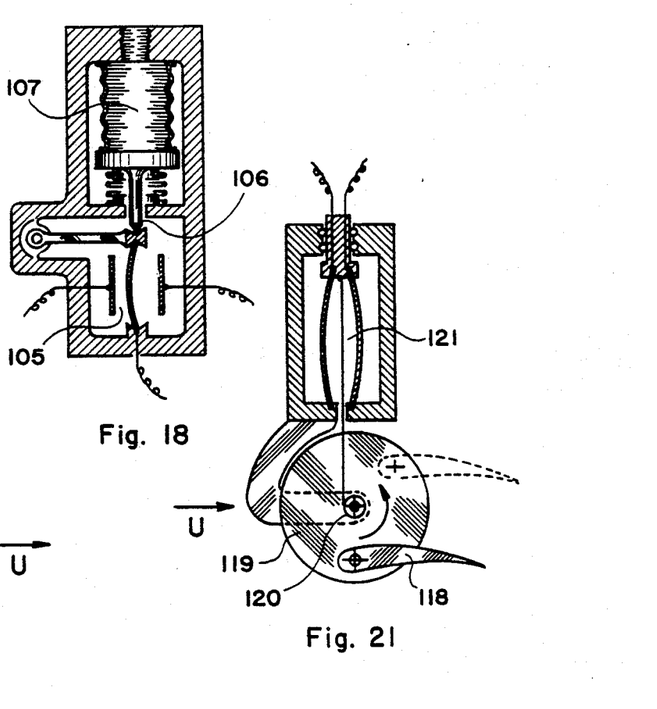
FIG. 18 illustrates an embodiment of a single mechanical displacement amplifying device employed in the construction of a pressure sensor.
FIG. 21 illustrates an embodiment of the target flowmeter employing a mechanical displacement amplifying device.

In FIG. 18 there is illustrated an embodiment of the absolute or gauge pressure sensor that employs the mechanical displacement amplifying device 105 of the type shown in FIG. 12 or 13 that measures the displacement transmitted by the displacement transmitting member 106 resulting from the pressure contained in the bellow type pressure chamber 107 as a measure of the pressure. In place of the particular embodiment of the mechanical displacement amplifying device shown, any one of the embodiments shown in FIGS. 1 through 14 may be employed. The absolute or gauge pressure sensor shown in FIG. 18 can be readily converted to a differential pressure sensor by introducing a second pressure into the chamber housing the mechanical displacement amplifying device 105. This embodiment of the pressure sensor operates on the principles set forth by one of the equations (8).

Figure 19:
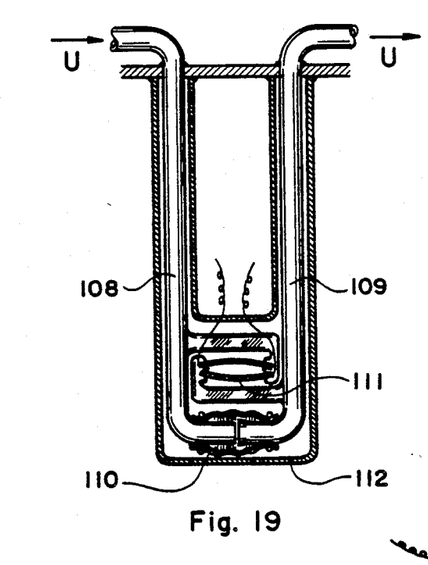
FIG. 19 illustrates an embodiment of the reaction force flowmeter employing a mechanical displacement amplifying device.

In FIG. 19 there is illustrated an embodiment of the flowmeter measuring the momentum flow rate, that comprises a pair of over-hanging sections 108 and 109 of the conduit with curved extremities connected to one another by a flexible and inflatable tubular coupling 110. A force sensor employing a mechanical displacement amplifying device 111 measures the tensile force between the two over-hanging sections of the conduit. As the conduit assembly is enclosed within a pressure containment vessel 112 filled with a liquid that is pressurized to the same pressure existing inside the flexible and inflatable tubular coupling 110, the tensile force measured by the force sensor by means of the mechanical displacement amplifying device 111 is equal to the momentum flow rate $\rho U^2 A$, where $\rho$ is the fluid density, U is the fluid velocity and A is the cross sectional area of the flow passage.

Figure 20:
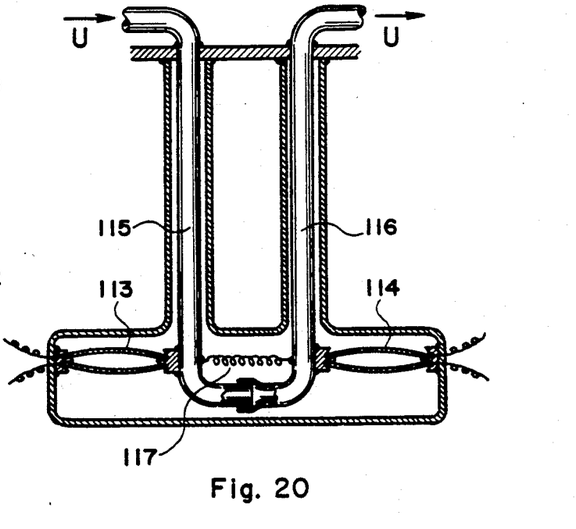
FIG. 20 illustrates another embodiment of the reaction force flowmeter employing a combination of two mechanical displacement amplifying devices.

In FIG. 20 there is illustrated another embodiment of the flowmeter measuring the momentum flow rate, which has essentially the same construction as that of the embodiment illustrated in FIG. 19. This embodiment employs a combination of two mechanical displacement amplifying devices 113 and 114, which combination measures the tensile force between the two over-hanging sections 115 and 116 of the conduit by using the principles set forth by one of equations (4), (5), (6) and (7) as explained in conjunction with the differential pressure sensors shown in FIGS. 10 and 11. The coil spring 117 providing preloaded bias tension between the two over-hanging sections of the conduit may be employed to set the optimum condition for the operation of the force measuring device comprising the two mechanical displacement amplifying devices 113 and 114, which may be one of the types shown in FIGS. 1 through 14.

In FIG. 21 there is illustrated an embodiment of the flowmeter employing a fluid dynamic target 118 having a cross section of airfoil shape, which is supported by a rotatably disposed circular disc 119. The fluid dynamic force of the fluid flow moving at velocity U rotates the disc to a position indicated by the fluid dynamic target shown in broken lines. A flexible string wrapped around a capstan 120 coaxially affixed to the rotatable disc 119 and extending therefrom converts the angular displacement of the disc 119 into a linear displacement and transmits it to the mechanical displacement amplifying device 121. This flowmeter determines the dynamic pressure of the fluid flow equal to $\frac{1}{2}\rho U^2$ as a function of the capacitance or resistance value representing the angular displacement of the disc 119. The embodiments shown in FIGS. 15 through 21 exemplify only a few applications of the mechanical displacement amplifying device of the present invention in the construction of measuring instruments of widely varying utilities, as the mechanical displacement amplifying device of the present invention provides a highly sensitive and wide ranging stress or strain sensor that constitutes foundations of many different measuring instruments.

While the principles of the present invention have now been made clear by the illustrative embodiments, there will be many modifications of the structures, arrangements, proportions, elements and materials, which are obvious to those skilled in the art and particularly adapted to the specific working environments and operating conditions in the practice of the invention without departing from those principles. It is not desired to limit the invention to the particular illustrative embodiments shown and described or to the particular applications in the construction of the instruments shown and described and accordingly, all suitable modifications and equivalents may be regarded as falling within the scope of the invention as defined by the claims which follow.

The embodiments of the invention, in which an exclusive property or priviledge is claimed, are defined as follows:

1. A device for measuring physical variable related to displacement of a target object comprising in combination:
   a) at least one thin planar member with two opposite extremities respectively supported by two supporting members disposed in an arrangement wherein at least one of the two support members is movable relative to the other of the two support members on a plane including the two opposite extremities of the thin planar member, said thin planar member constituting a first electrical terminal;
   b) means for transmitting displacement of the target object to said at least one of the two support members, wherein increase of relative distance between the two support members decreases bending deflection of the thin planar member and decrease of the relative distance between the two support members increases bending deflection of the thin planar member;

c) a second electrical terminal disposed next to the thin planar member constituting the first electrical terminal in an arrangement wherein electrical resistance between the first and second electrical terminals varies as a function of bending deflection of the thin planar member; and d) means for measuring electrical resistance between the first and second electrical terminals as a measure of displacement of the target object.

2. A combination as set forth in claim 1 wherein said combination includes means for determining numerical value of the physical variable as a function of electrical resistance between the first and second electrical terminals.

3. A combination as set forth in claim 1 wherein another thin planar member disposed next to said at least one thin planar member in a face-to-face arrangement and supported by the two support members respectively at two opposite extremities thereof constitutes the second electrical terminal, wherein said at least one and another thin planar members bend in a mirror image to one another about a plane therebetween as relative distance between the two support members changes.

4. A combination as set forth in claim 3 wherein said combination includes means for determining numerical value of the physical variable as a function of electrical resistance between the first and second electrical terminals.

5. A combination as set forth in claim 1 wherein at least one elongated member disposed next to said at least one thin planar member constitutes the second electrical terminal, wherein the contact surface area between the elongated member and the thin planar member increases with increasing bending deflection of the thin planar member and vice versa, and the electrical resistance between the elongated member and the thin planar member changes as the contact surface area therebetween changes.

6. A combination as set forth in claim 5 wherein said combination includes means for determining numerical value of the physical variable as a function of electrical resistance between the first and second electrical terminals.

7. A combination as set forth in claim 1 wherein said combination includes a third electrical terminal disposed next to the thin planar member in an arrangement wherein the second and third electrical terminals are disposed on the two opposite sides of the thin planar member, and further includes means for measuring electrical resistance between the first and third electrical terminals as another measure of displacement of the target object.

8. A combination as set forth in claim 7 wherein said combination includes means for determining numerical value of the physical variable as a function of electrical resistance between the first and second electrical terminals and electrical resistance between the first and third electrical terminals.

9. A combination as set forth in claim 1 wherein said combination includes another device for measuring physical variables comprising the same elements included in said a device for measuring physical variables, wherein the displacement of the target member in a first direction increases bending deflection of the thin planar member included in said a device and decreases bending deflection of the thin planar member included in said another device, and the displacement of the target member in a second direction opposite to said first direction decreases bending deflection of the thin planar member included in said a device and increases bending deflection of the thin planar member included in said another device.

10. A combination as set forth in claim 9 wherein said combination includes means for determining numerical value of the physical variable as a function of electrical resistance between the first and second electrical terminals included in said a device and electrical resistance between the first and second electrical terminals included in said another device.

11. A combination as set forth in claim 9 wherein the second electrical terminal included in each of said a and another devices comprises another thin planar member disposed next to said at least one thin planar member in a face-to-face arrangement and supported by the two support members respectively at the two opposite extremities thereof, wherein said at least one and another thin planar members bend in a mirror image to one another about a plane therebetween as the displacement of the target object changes.

12. A combination as set forth in claim 9 wherein the second electrical terminal included in each of said a and another devices comprises at least one elongated member disposed next to said at least one thin planar member, wherein the contact surface area between the elongated member and the thin planar member increases with increasing bending deflection of the thin planar member and vice versa, and electrical resistance between the elongated member and the thin planar member changes as the contact surface area therebetween changes.

13. A device for measuring physical variable related to displacement of a target object comprising in combination:

a) at least one thin planar member with two opposite extremities respectively supported by two supporting members disposed in an arrangement wherein at least one of the two support members is movable relative to the other of the two support members on a plane including the two opposite extremities of the thin planar member, said thin planar member constituting a first electrical terminal;

b) means for transmitting displacement of the target object to said at least one of the two support members, wherein increase of relative distance between the two support members decreases bending deflection of the thin planar member and decrease of relative distance between the two support members increases bending deflection of the thin planar member;

c) a second electrical terminal disposed in a stationary arrangement on one side of the thin planar member and a third electrical terminal disposed in a stationary arrangement on the other side of the thin planar member opposite to said one side; and d) a first means for measuring electrical capacitance between the first and second electrical terminals and a second means for measuring electrical capacitance between the first and third electrical terminals as measures of displacement of the target object.

14. A combination as set forth in claim 13 wherein said combination includes means for determining numerical value of the physical variable as a function of electrical capacitance between the first and second electrical terminals and electrical capacitance between the first and third electrical terminals.

15. A combination as set forth in claim 13 wherein each of the second and third electrical terminals comprises a rigid planar member disposed in a fixed arrangement parallel to said at least one thin planar member.

16. A combination as set forth in claim 15 wherein said combination includes means for determining numerical value of the physical variable as a function of electrical capacitance between the first and second electrical terminals and electrical capacitance between the first and third electrical terminals.

17. A combination as set forth in claim 15 wherein said combination includes another thin planar member made of a dielectric material disposed next to said at least one thin planar member in a face-to-face arrangement and supported by the two support members respectively at two opposite extremities thereof, wherein said at least one and another thin planar members bend in a mirror image to one another about a plane therebetween as relative distance between the two support members changes.

18. A combination as set forth in claim 17 wherein said combination includes means for determining numerical value of the physical variable as a function of electrical capacitance between the first and second electrical terminals and electrical capacitance between the first and third electrical terminals.

19. A combination as set forth in claim 13 wherein said combination includes another thin planar member made of a dielectric material disposed next to said at least one thin planar member in a face-to-face arrangement and supported by the two support members respectively at two opposite extremities thereof, wherein said at least one and another thin planar members bend in a mirror image to one another about a plane therebetween as relative distance between the two support members changes.

20. A combination as set forth in claim 19 wherein said combination includes means for determining numerical value of the physical variable as a function of electrical capacitance between the first and second electrical terminals and electrical capacitance between the first and third electrical terminals.

21. A device for measuring physical variable related to displacement of a target comprising in combination:

a) a first pair of thin planar members disposed in a side-by-side arrangement and supported by two support members respectively at opposite extremities thereof, wherein at least one of the two support members is movable relative to the other of the two support members on a plane intermediate the first pair of thin planar members, and the first pair of thin planar members bend in a mirror image to one another about the plane therebetween as relative distance between the two support members changes;

b) a second pair of thin planar members disposed in a side-by-side arrangement and supported by two support members respectively at opposite extremities thereof, wherein at least one of the two support members is movable relative to the other of the two support members on a plane intermediate the second pair of thin planar members, and the second pair of thin planar members bend in a mirror image to one another about the plane therebetween as relative distance between the two support members changes;

c) means for transmitting displacement of the target object to said at least one of the two support members supporting the first pair of thin planar members and to said at least one of the two support members supporting the second pair of thin planar members, wherein displacement of the target object in a first direction increases bending deflection of the first pair of thin planar members and decreases bending deflection of the second pair of thin planar members, and displacement of the target object in a second direction opposite to said one direction decreases bending deflection of the first pair of thin planar members and increases bending deflection of the second pair of thin planar members; and d) a first means for measuring electrical capacitance between the first pair of thin planar members, and a second means for measuring electrical capacitance between the second pair of thin planar members as measures of displacement of the target object.

22. A combination as set forth in claim 21 wherein said combination includes means for determining numerical value of the physical variable as a function of electrical capacitance between the first pair of thin planar members and electrical capacitance between the second pair of thin planar members.

* * * * *